United States Patent
Feng et al.

(10) Patent No.: US 8,223,671 B2
(45) Date of Patent: Jul. 17, 2012

(54) NETWORK SYSTEM SUPPORTING SPANNING TREE PROTOCOL, RELAY APPARATUS THEREOF, AND METHOD OF CREATING SPANNING TREE TOPOLOGY THEREOF

(75) Inventors: Fei Fei Feng, Yongin-si (KR); Hong-kyu Jung, Yongin-si (KR); Byung-suk Kim, Uiwang-si (KR); Geoffrey M Garner, Red Bank, NJ (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 455 days.

(21) Appl. No.: 12/048,540

(22) Filed: Mar. 14, 2008

(65) Prior Publication Data

US 2009/0109876 A1 Apr. 30, 2009

(30) Foreign Application Priority Data

Oct. 24, 2007 (KR) .................. 10-2007-0107445

(51) Int. Cl.
*H04L 12/28* (2006.01)
(52) U.S. Cl. ...................... 370/256; 370/401
(58) Field of Classification Search .............. None
See application file for complete search history.

(56) References Cited

U.S. PATENT DOCUMENTS

| 7,839,872 | B2* | 11/2010 | Diab et al. ............ 370/401 |
| 2002/0101875 | A1* | 8/2002 | Lui et al. ............. 370/402 |
| 2007/0206513 | A1* | 9/2007 | Cho et al. ............ 370/254 |
| 2007/0263554 | A1* | 11/2007 | Finn ................... 370/256 |
| 2008/0159304 | A1* | 7/2008 | Ozugur et al. ........ 370/401 |
| 2008/0285459 | A1* | 11/2008 | Diab et al. ........... 370/238 |

FOREIGN PATENT DOCUMENTS

| KR | 10-2004-0009467 A | 1/2004 |
| KR | 10-2004-0024485 A | 3/2004 |
| KR | 10-2006-0068496 A | 6/2006 |
| WO | 03063422 A1 | 7/2003 |
| WO | 2004059929 A2 | 7/2004 |
| WO | 2005008963 A1 | 1/2005 |

OTHER PUBLICATIONS 802.1D Media Access Control (MAC) Bridges, Jun. 9, 2004, IEEE Standards, p. 50-51.*

* cited by examiner

*Primary Examiner* — Chirag Shah
*Assistant Examiner* — Jenkey Van
(74) *Attorney, Agent, or Firm* — Sughrue Mion, PLLC (57) ABSTRACT

Provided are a network system supporting a spanning tree protocol (STP), a relay apparatus thereof, and a method of creating a spanning tree. Proposed is a method of creating a tree topology, between AVB bridges, using a STP message including a group MAC address which is different from that used in a non-AVB (Audio Video Bridging) bridge (that is, a bridge without the function of AVB), in order to form a minimum number of AVB clouds. Therefore, it is possible to efficiently ensure transmission quality of a multimedia stream such as an AVB stream.

17 Claims, 10 Drawing Sheets

FIG.6A network setting
(physical configuration)

FIG.6B

6 AVB Clouds

2 AVB Clouds

NETWORK SYSTEM SUPPORTING SPANNING TREE PROTOCOL, RELAY APPARATUS THEREOF, AND METHOD OF CREATING SPANNING TREE TOPOLOGY THEREOF

CROSS REFERENCE TO RELATED APPLICATIONS

This application claims priority from Korean Patent Application No. 10-2007-0107445, filed on Oct. 24, 2007, the disclosure of which is incorporated herein in its entirety by reference.

BACKGROUND OF THE INVENTION

1. Field of the Invention

The present invention relates to a network system, and more particularly, to a network system supporting a spanning tree protocol, a relay apparatus thereof, and a method of creating a spanning tree.

2. Description of the Related Art

An example of a network system for transmitting data between a plurality of different terminals is an Ethernet. The Ethernet utilizes a bridge or gateway as a relay apparatus for extending a network. That is, the Ethernet includes a plurality of Local Area Networks (LANs) that are connected respectively to a plurality of terminals, and a plurality of bridges which connect the LANs to one another. A message that is transmitted between the bridges can be bridged from one LAN to another LAN, for example, according to the IEEE802.1D standard which defines Media Access Control (MAC) bridging.

In such a network system which is connected by bridges, if multiple paths exist between the bridges, a loop is formed and thus a traffic looping problem occurs, in which a message sent from a bridge is circulated around the loop. In principle, only one single path has to exist between two bridges. For this reason, each bridge supports a spanning tree algorithm for executing a spanning tree protocol (referred to as a STP) based on the IEEE802.1D standard, which is used to avoid the above-mentioned traffic looping problem.

Meanwhile, it is known that the Ethernet is not suitable for transmitting multimedia data sensitive to a delay in transmission time, but recently a technique for transmitting multimedia data such as images or sounds via existing Ethernet are actively being developed. Such a technique, which is called Audio Video Bridging (AVB), is being standardized by the IEEE802.1.

According to the current consensus of the AVB standardization committee, since Quality of Service (QoS) of AVB protocols 0.1AS, 1Qat, and 0.1Qav is ensured only within an AVB cloud, all bridges should be AVB bridges in order to ensure QoS.

Here, Non-AVB bridges or AVB bridges can construct a tree topology from which redundant routes are removed by applying a spanning tree protocol thereto. The tree topology includes one or several AVB clouds which are connected via non-AVB bridges. However, the tree topology has a problem in that a network range capable of ensuring transmission quality of an AVB stream is limited to within an AVB cloud. In particular, as the number of AVB clouds included in the tree topology increases, it becomes more difficult to ensure transmission quality of a multimedia stream.

SUMMARY OF THE INVENTION

The present invention provides a network system supporting a spanning tree protocol which can efficiently provide high transmission quality for a multimedia stream, a relay apparatus thereof, and a method of creating a spanning tree.

The present invention further provides a network system for supporting a spanning tree protocol for ensuring high transmission quality of a multimedia stream, a relay apparatus thereof, and a method of creating a spanning tree, which take into consideration a fact that networks having the same physical configuration can have different numbers of AVB clouds depending on a root node when a spanning tree protocol is applied to remove redundant routes, and a network range capable of ensuring transmission quality of a multimedia stream is widened as the number of possible AVB clouds decreases.

According to an aspect of the present invention, there is provided a network system supporting a spanning protocol (STP) including: at least one AVB bridge using a group MAC address of an extra area which is assigned to exchange a STP message between AVB clouds in the network system; and at least one non-AVB bridge using a group MAC address of a normal area which is assigned to exchange a STP message between non-AVB bridges in the network system.

The AVB bridge creates a spanning tree using a STP message including the group MAC address of the extra area, thereby minimizing the number of AVB clouds in the network system.

If the AVB bridge receives a STP message including the group MAC address of the normal area, the AVB bridge forwards the STP message to a non-AVB port outside a boundary of an AVB cloud.

According to another aspect of the present invention, there is provided a relay apparatus of a network supporting a spanning tree protocol (STP), the relay apparatus including: at least two ports; a receiver receiving a message for setting up a network path from a port of the at least two ports; a message controller transferring the received message to a predetermined STP processor if the received message supports an Audio Video Bridging (AVB) protocol, or forwarding the received message to another activated port without passing the received message through the predetermined STP processor if the received message does not support the AVB protocol; and a STP processor creating a spanning tree from which a repeated route is removed, on the basis of the message received from the message controller.

The STP processor creates the spanning tree using the received message if the received message supports the AVB protocol, thereby minimizing the number of AVB clouds in the network.

The message processor determines whether the received message supports the AVB protocol, on the basis of a group MAC address included in the received message.

According to another aspect of the present invention, there is provided~claim 12.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A general spanning tree creating method is carried out by selecting an Audio Video Bridging (AVB) bridge as a root node, and setting the cost of each port so that connecting two AVB ports to each other is more selected than connecting an AVB port to a non-AVB port or connecting two non-AVB ports to each other. A spanning tree algorithm for this is very simple, and is disadvantageous in that path settings depend on a root node and in some cases, optimal results may not be obtained.

Figure 1A:
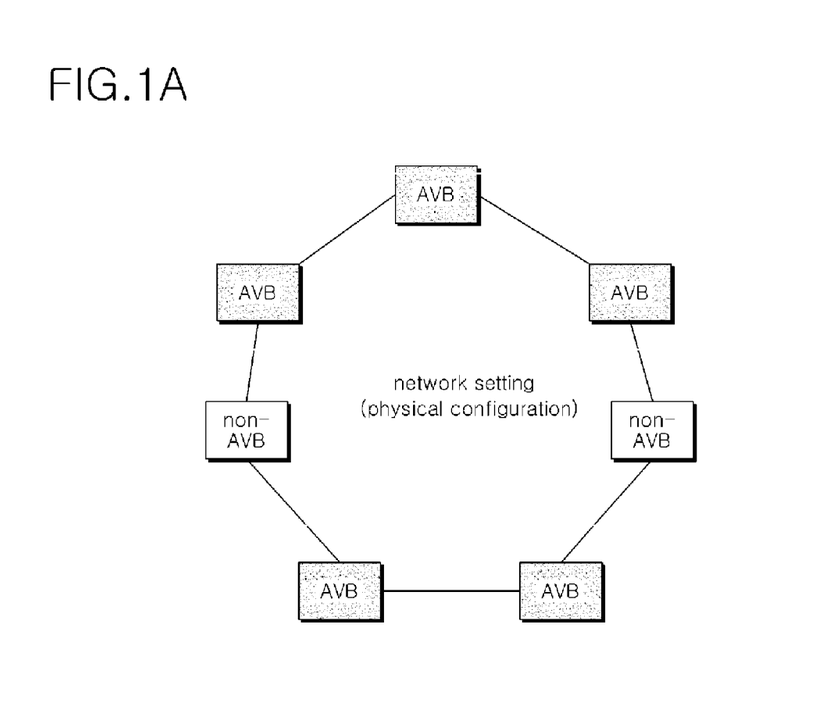
FIGS. 1A, 1B, and 1C show examples in which network paths are set up using a general spanning tree creating method.
Figure 1B:
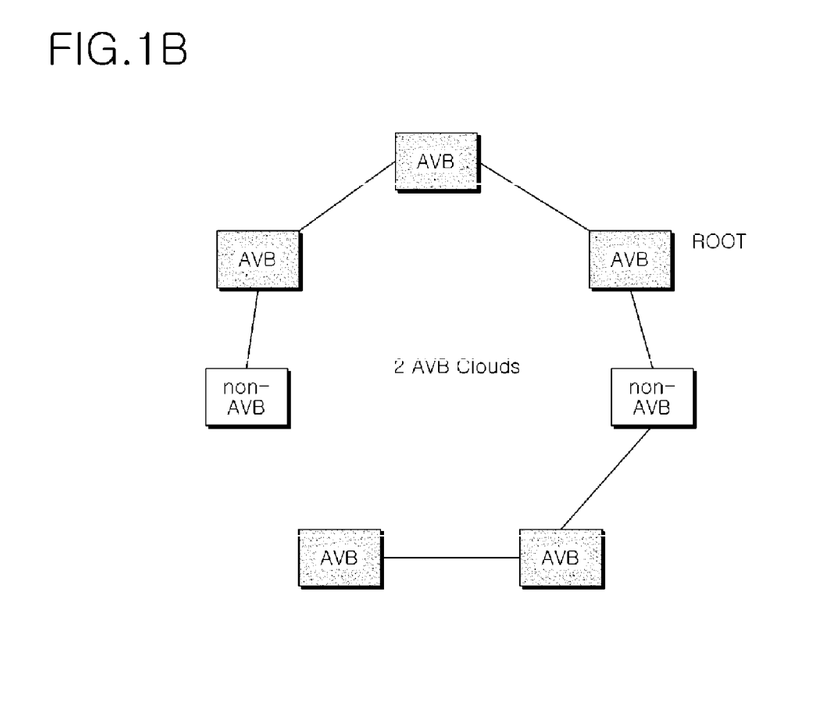
Figure 1C:
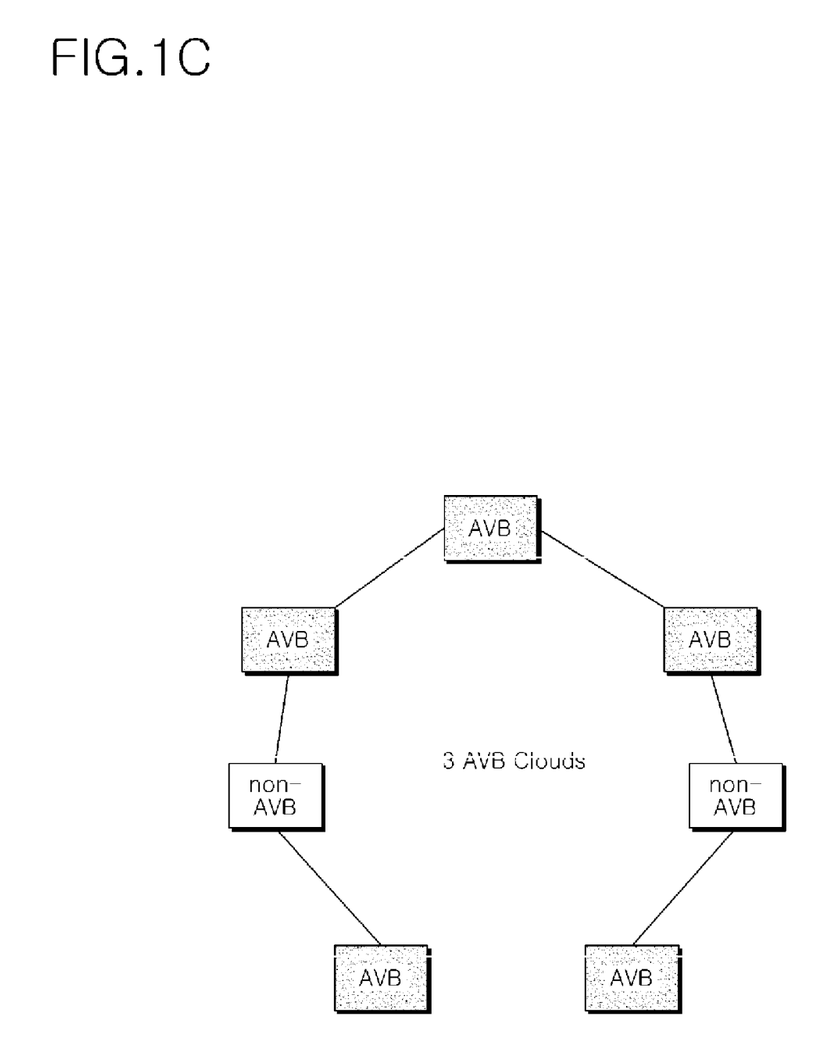

FIGS. 1A, 1B, and 1C show examples in which network paths are set up using a conventional spanning tree creating method.

FIG. 1A shows an example of a network configuration which includes AVB bridges and non-AVB bridges and supports a spanning tree protocol. In the network configuration illustrated in FIG. 1A, the AVB and non-AVB bridges are physically connected to one another.

FIG. 1B shows an example of a network configuration when a general spanning algorithm is applied to the network configuration illustrated in FIG. 1 in a case where the upper, right bridge of the bridges is set as a root node. In the network configuration illustrated in FIG. 1B, a repeated route is removed and two AVB clouds are formed and connected to each other via non-AVB bridges.

FIG. 1C shows an example of a network configuration when a general spanning algorithm is applied to the network configuration illustrated in FIG. 1A in a case where the upper, central bridge of the bridges is set to a root node. In the network configuration illustrated in FIG. 1C, a repeated route is removed and three AVB clouds are formed and connected to one another via non-AVB bridges.

That is, existing spanning tree protocols (for example, a spanning tree protocol (STP), a rapid spanning tree protocol (RSTP), or a multiple spanning tree protocol (MSTP) based on the IEEE 802.1 standard) create a tree topology which includes one or more AVB clouds connected via non-AVB bridges depending on a root node. Here, since no AVB stream can escape from an AVB cloud, the coverage of an AVB stream on the network is limited.

Accordingly, a network setting method is needed which can create a tree structure having a minimum number of AVB clouds. The present invention proposes a method of creating a tree having a minimum number of AVB clouds in a network supporting an AVB apparatus and a non-AVB apparatus on the basis of an existing spanning tree protocol.

Hereinafter, a bridge which is a relay apparatus for extending a network according to an embodiment of the present invention will be described. However, the relay apparatus according to the embodiment of the present invention is not limited to a bridge, and may include various network relay apparatuses such as a gateway.

Figure 2:
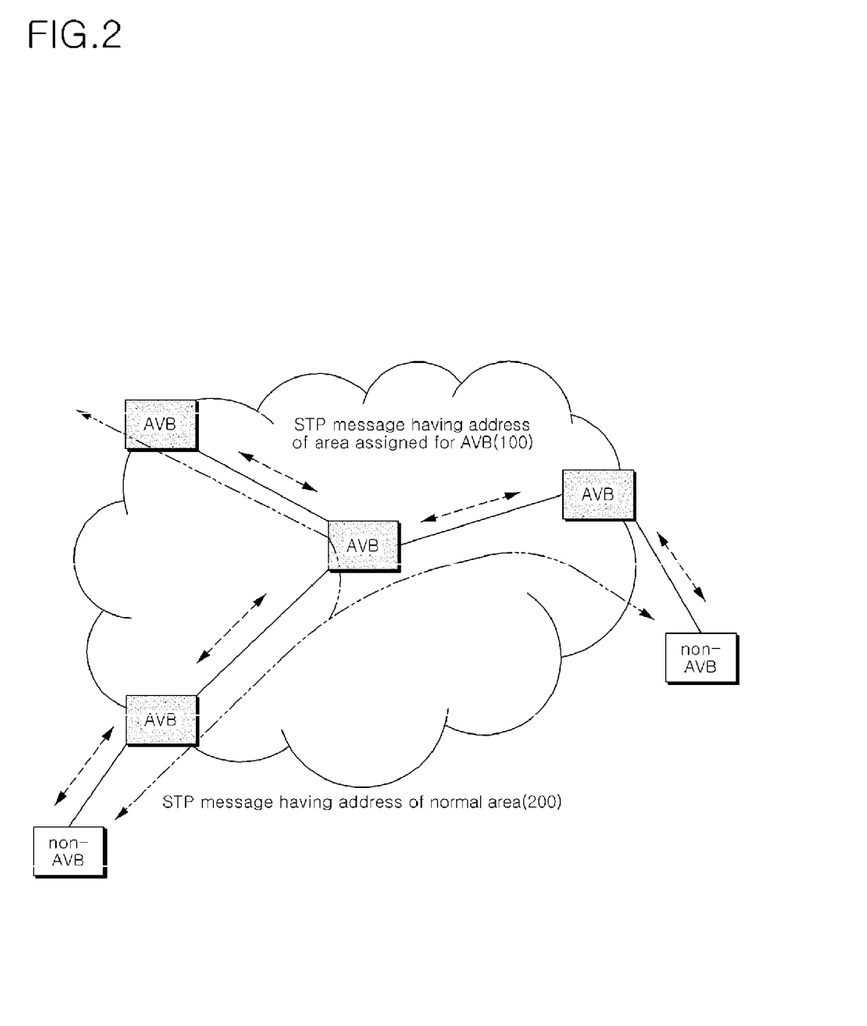
FIG. 2 is a view for explaining a network system supporting a spanning tree protocol, according to an embodiment of the present invention.

FIG. 2 is a view for explaining a network system supporting a spanning tree protocol, according to an embodiment of the present invention.

Referring to FIG. 2, a basic concept of a network system supporting a spanning tree protocol, according to an embodiment of the present invention, is to use an extra STP message 100 which is transmitted between AVB bridges connected to each other and which is different from that used between non-AVB bridges, in order to form the maximum size of an AVB cloud.

In FIG. 2, information for setting up a network path is received and transmitted through a STP message 100 having an address of an extra area which is assigned for an AVB protocol, between AVB bridges which are connected to each other. A STP message 200 having an address of a normal area is forwarded to a non-AVB port outside the boundary of an AVB cloud, without being used to create a spanning tree for setting up the network path.

In detail, AVB bridges use a group MAC address of an extra area which is assigned to exchange a STP message between AVB clouds. However, if non-AVB bridges receive a STP message 100 having the group MAC address of the extra area, the non-AVB bridges will ignore the STP message 100 because they cannot interpret the STP message 100.

Meanwhile, the non-AVB bridges use a group MAC address of a normal area in order to exchange a STP message between all non-AVB bridges in the network. However, if AVB bridges receive a STP message 200 having the group MAC address of the normal area, the AVB bridges forward the STP message 200 to a port outside the boundary of an AVB cloud, without using the STP message 200 to create a spanning tree for setting up a network path. Accordingly, since a non-AVB cloud cannot obtain information about AVB bridges forming an AVB cloud, the non-AVB cloud will consider an AVB cloud as a transparent LAN.

In summary, the network system supporting a spanning tree protocol, according to the embodiment of the present invention, includes at least one AVB bridge using a group MAC address of an extra area which is assigned to exchange a STP message between AVB clouds in a network system, and at least one non-AVB bridge using a group MAC address of a normal area in order to exchange a STP message between non-AVB bridges in the network system. Here, the STP message may be a bridge packet data unit (hereinafter, simply referred to as "BPDU") including information for setting up a network path.

Here, the AVB bridges can minimize the number of AVB clouds in the network by creating a spanning tree using a STP message including the group MAC address of the extra area. Also, if an AVB bridge receives a STP message including the group MAC address of the normal area, the AVB bridge forwards the STP message to a non-AVB port outside the boundary of an AVB cloud.

Meanwhile, if a non-AVB bridge (a legacy bridge) receives a STP message using the group MAC address of the extra area, the non-AVB bridge ignores or discards the STP message. That is, since a non-AVB cloud cannot obtain information about AVB bridges forming an AVB cloud, the non-AVB cloud considers an AVB cloud as a transparent LAN. The non-AVB bridge creates a spanning tree using the STP message including the group MAC address of the normal area.

Here, the STP message includes a group MAC address. A group MAC address of a normal area may be an address defined in the first row of Table 1. A group MAC address of an extra area which is assigned for the AVB protocol according to the embodiment of the present invention may be an address defined in one of the reserved areas for future standardization of Table 1.

TABLE 1

| Assignment | Value |
| --- | --- |
| Bridge Group Address | 01-80-C2-00-00-00 |
| IEEE Std 802.3x Full Duplex PAUSE operation | 01-80-C2-00-00-01 |
| IEEE Std 802.3ad Slow_Protocols_Multicast address | 01-80-C2-00-00-02 |
| IEEE P802.1X PAE address | 01-80-C2-00-00-03 |
| Reserved for future standardization | 01-80-C2-00-00-04 |
| Reserved for future standardization | 01-80-C2-00-00-05 |
| Reserved for future standardization | 01-80-C2-00-00-06 |
| Reserved for future standardization | 01-80-C2-00-00-07 |
| Reserved for future standardization | 01-80-C2-00-00-08 |
| Reserved for future standardization | 01-80-C2-00-00-09 |
| Reserved for future standardization | 01-80-C2-00-00-0A |
| Reserved for future standardization | 01-80-C2-00-00-0B |
| Reserved for future standardization | 01-80-C2-00-00-0C |
| Reserved for future standardization | 01-80-C2-00-00-0D |
| Reserved for future standardization | 01-80-C2-00-00-0E |
| Reserved for future standardization | 01-80-C2-00-00-0F |

Figure 3:
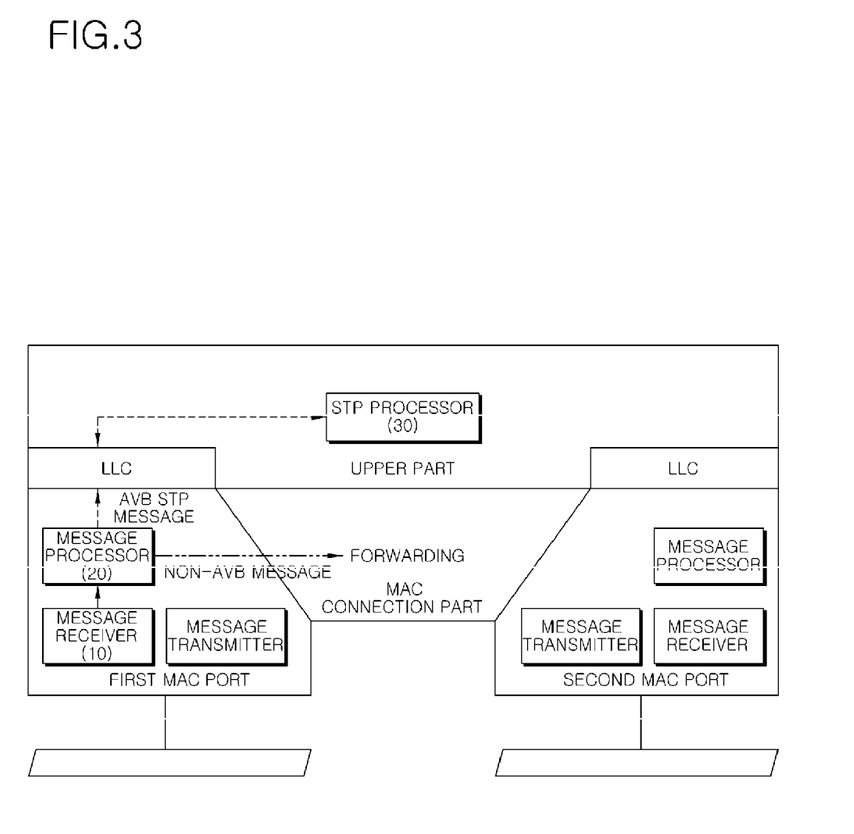
FIG. 3 is a block diagram of a network relay apparatus according to an embodiment of the present invention.

Meanwhile, FIG. 3 is a block diagram of a network relay apparatus according to an embodiment of the present invention.

Referring to FIG. 3, the network relay apparatus supporting a spanning tree protocol, for example an AVB bridge illustrated in FIG. 2, includes at least two ports 40, a message receiver 10, a message processor 20, and a STP processor 30.

The at least two ports 40 are connected to different networks, and function to connect the networks to each other or to block the networks from each other.

The message receiver 10 receives a message for setting up a network path from each port 40. The message received through the message receiver 10 may be a bridge packet data unit (BPDU) including information for setting up a network path. If it is determined that the message received through the message receiver 10 supports an AVB protocol, the message processor 20 transfers the received message to the STP processor 30. If it is determined that the received message does not support an AVB protocol, the message processor 20 forwards the received message to another activated port without passing it through the STP processor 30.

The message processor 20 may determine whether the received message supports an AVB protocol, on the basis of a group MAC address included in the received massage. That is, if it is determined that a group MAC address included in the received message is a group MAC address of an extra area which is assigned for an AVB protocol, the message processor 20 transfers the received message to the STP processor 30, and if it is determined that the group MAC address included in the received message is a group MAC address of a normal area, the message processor 20 forwards the received message to another activated port without passing it through the STP processor 30.

The STP processor 30 creates a spanning tree from which repeated routes are removed, using the message transferred through the message processor 20. By creating a spanning tree using a message which supports an AVB protocol, instead of creating a spanning tree for all received messages, the number of AVB clouds in the network can be minimized. That is, in the network relay apparatus supporting the AVB protocol, a spanning tree algorithm is applied to networks only using a BPDU message supporting an AVB protocol, so that the maximum size of an AVB cloud can be achieved and thus a spanning tree topology having a minimum number of AVB clouds can be created.

Figure 4:
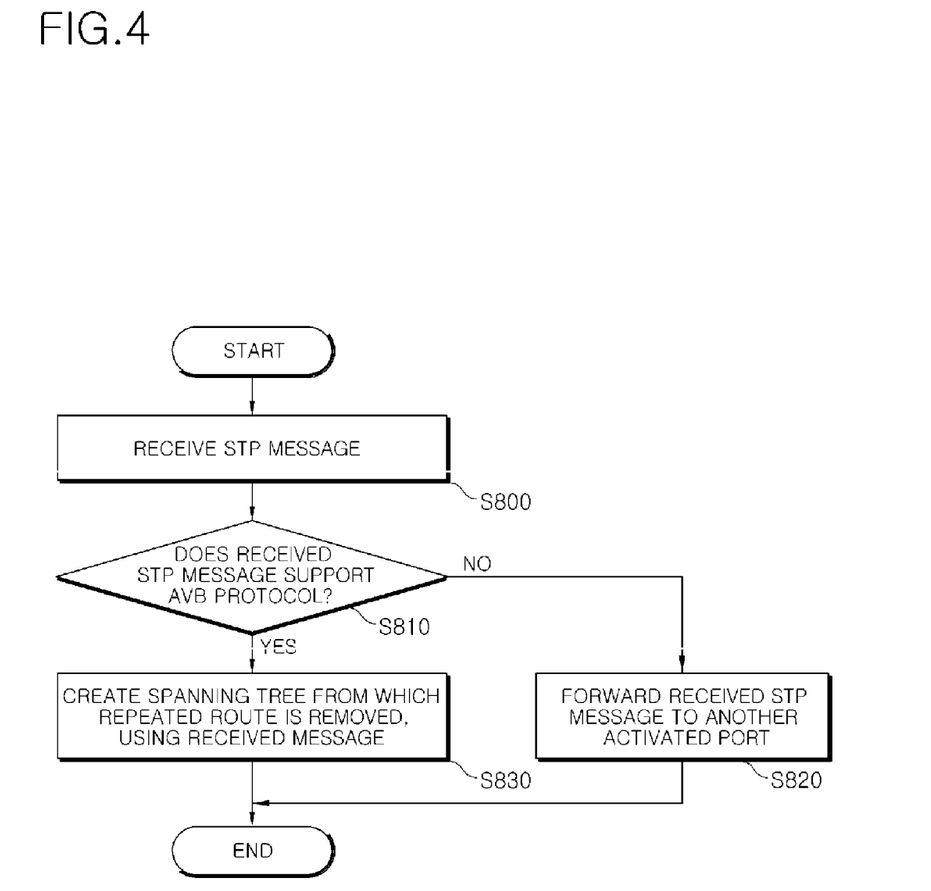
FIG. 4 is a flowchart of a spanning tree creating method according to an embodiment of the present invention, which is performed by the network relay apparatus according to an embodiment illustrated in FIG. 3.

FIG. 4 is a flowchart of a spanning tree creating method according to an embodiment of the present invention, which is performed by the network relay apparatus according to an embodiment illustrated in FIG. 3.

Referring to FIG. 4, in order to create a spanning tree in the network supporting a spanning tree protocol, according to the embodiment of the present invention, first, a message for setting up a network path from one of at least two ports is received (operation S800), and it is determined whether the received message supports an AVB protocol, on the basis of a group MAC address included in the received message (operation S810). Here, the received message may be a bridge packet data unit (BPDU) including information for setting up a network path.

If the received message does not support an AVB protocol, the received message is forwarded to another activated port (S820). That is, if the group MAC address included in the received message is a group MAC address of a normal group, the received message is forwarded to another activated port, without creating a spanning tree.

If the received message supports an AVB protocol, a spanning tree from which repeated routes are removed is created using the received message (operation S830). That is, if a group MAC address included in the received message is a group MAC address of an extra area which is assigned for an AVB protocol, a spanning tree is generated using the received message. Accordingly, by creating a spanning tree using a message which supports an AVB protocol, the number of AVB clouds in the network can be minimized.

A network system supporting a spanning tree protocol having a minimum number of AVB clouds, a relay apparatus thereof, and a method of creating a spanning tree, according to embodiments of the present invention, have been described above.

Figure 5A:
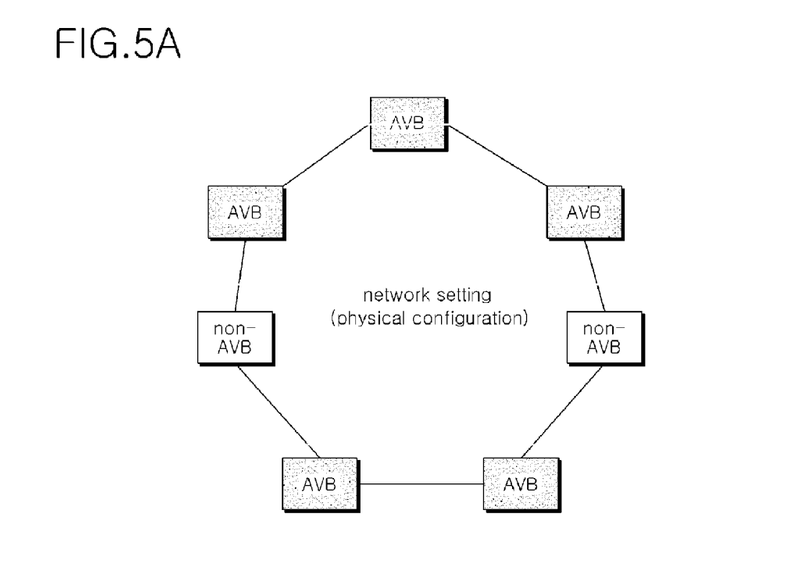
FIGS. 5A, 5B, and 5C show examples in which network paths are set up using a spanning tree creating method according to an embodiment of the present invention.
Figure 5B:
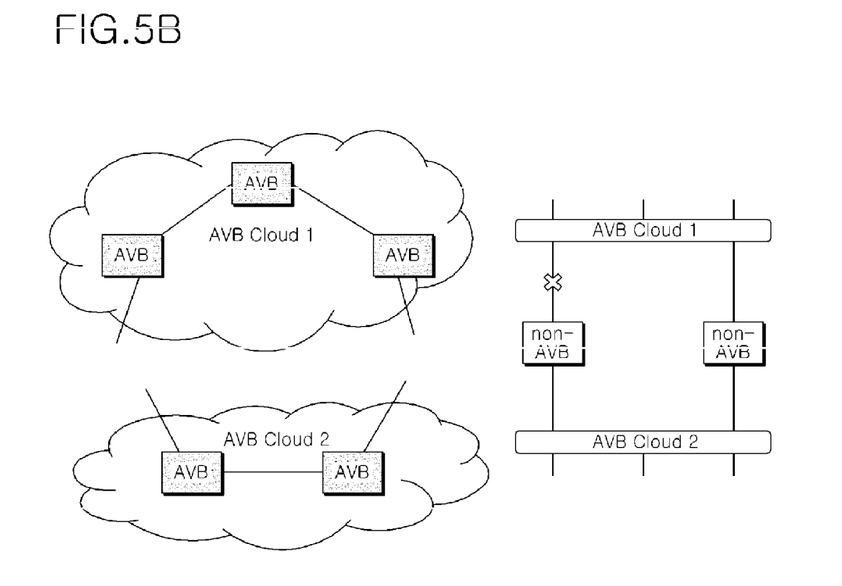
Figure 5C:
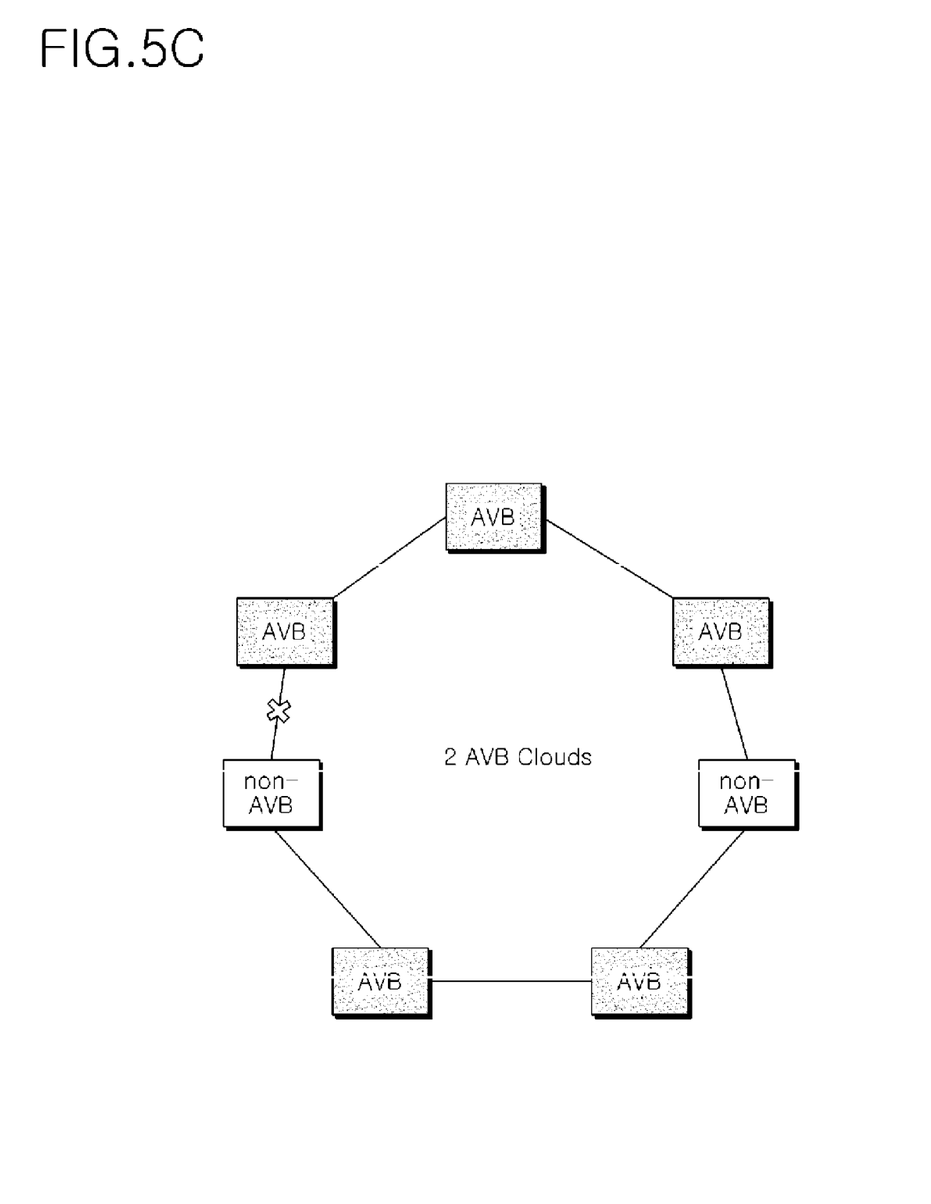

FIGS. 5A, 5B, and 5C show examples in which network paths are set up using a spanning tree creating method according to an embodiment of the present invention.

FIG. 5A shows a network system having the same physical configuration as that illustrated in FIG. 1A. When the spanning tree creating method according to this embodiment of the present invention is applied to the network system illustrated in FIG. 5A, network paths illustrated in FIGS. 5B and 5C can be obtained. By exchanging information through a STP message including a group MAC address of an extra area which is assigned to AVB bridges, network settings having a minimum number of AVB clouds are possible.

FIGS. 6A through 6D show other examples in which network paths are set up using a spanning tree creating method according to an embodiment of the present invention.

Figure 6A:
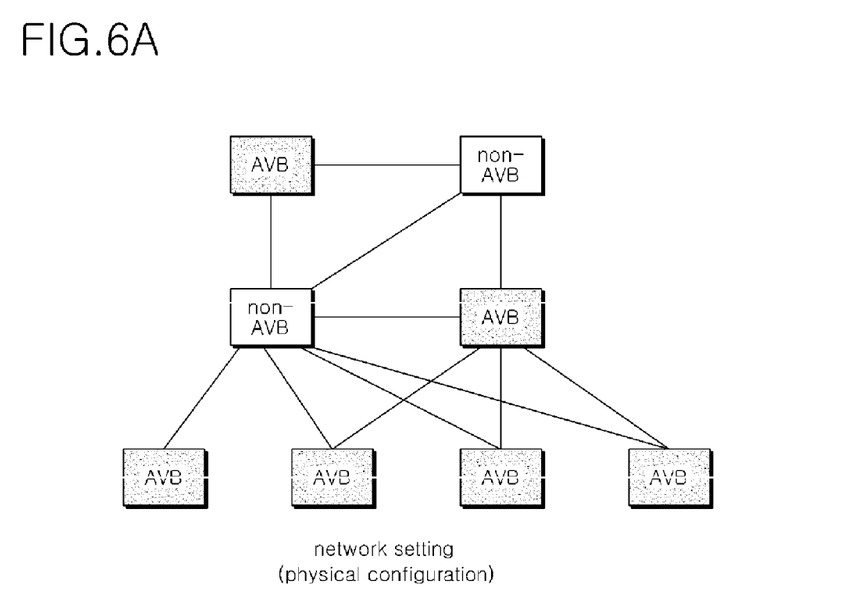
FIGS. 6A through 6D show other examples in which network paths are set up using a spanning tree creating method according to an embodiment of the present invention.
Figure 6B:
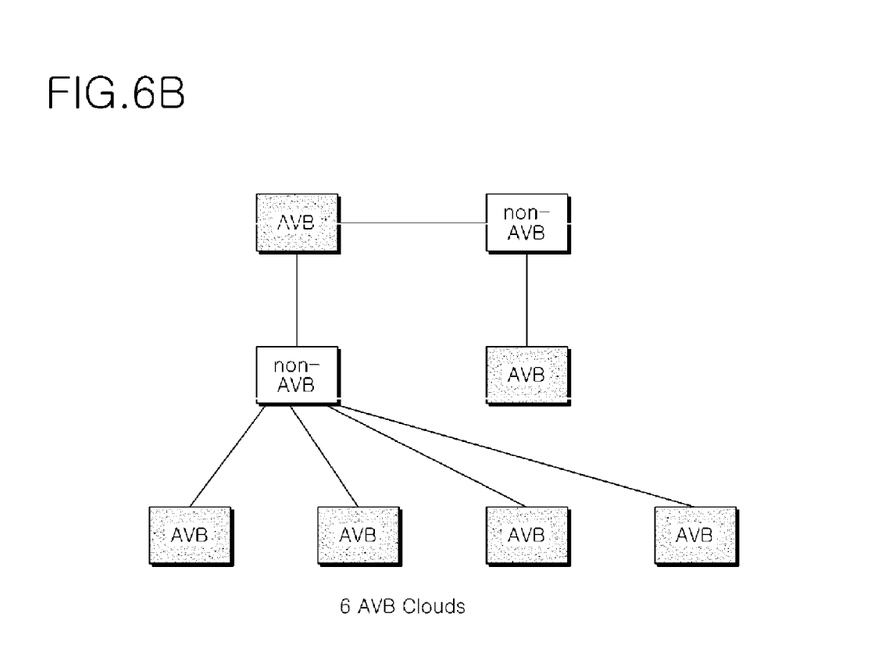

FIG. 6A shows an example of a physical network configuration. As illustrated in FIG. 6B, when a general spanning tree creating method is applied to the network configuration illustrated in FIG. 6A, 6 AVB clouds can be created in the worst case.

Figure 6C:
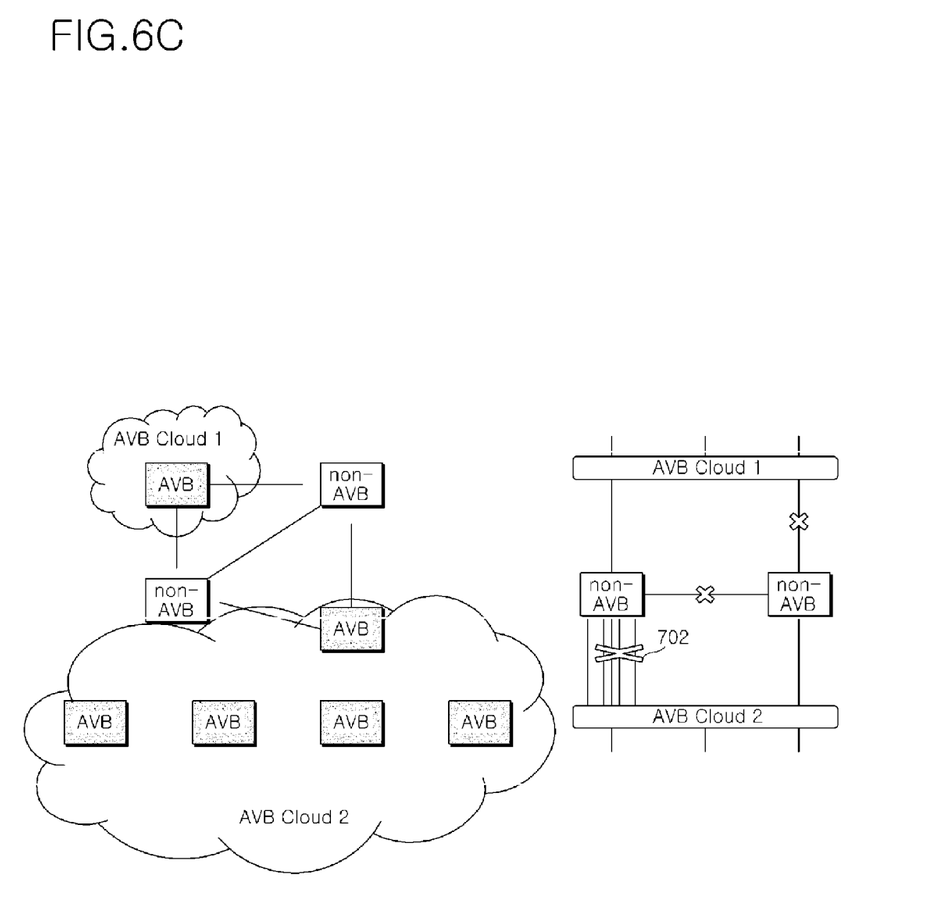
Figure 6D:
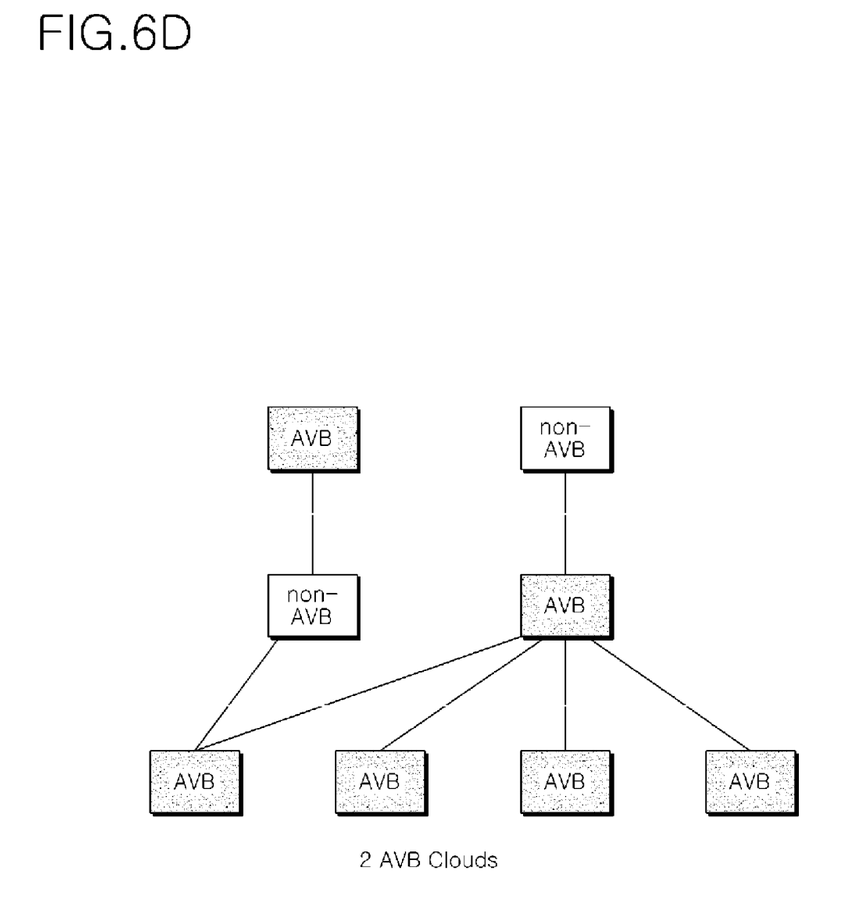

However, when the spanning tree creating method according to this embodiment of the present invention is applied to the network configuration illustrated in FIG. 6A, network paths having a minimum number of AVB clouds can be obtained as illustrated in FIGS. 6C and 6D.

According to an embodiment of the present invention, in a network supporting an AVB apparatus and a non-AVB apparatus on the basis of an existing spanning tree protocol (STP, RSTP, and MSTP), a method for creating a tree topology having a minimum number of AVB clouds can be provided. Accordingly, it is possible to efficiently provide high transmission quality for a multimedia stream such as an AVB stream.

Heretofore, a method of creating a tree having a minimum number of AVB clouds in a network system having AVB bridges and non-AVB bridges has been described. However, the method can be generalized to a method of creating a tree having a minimum number of X-clouds for a specific X technique.

As described above, according to an aspect of the present invention, there are provided a network system which can efficiently provide high transmission quality for a multimedia stream by minimizing the number of AVB clouds to enlarge the coverage of an AVB cloud which ensures the transmission quality, a relay apparatus thereof, and a method of creating a spanning tree.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A relay apparatus of a network supporting a spanning tree protocol (STP), the relay apparatus comprising:
    at least two ports;
    a receiver receiving a message for setting up a network path from a port of the at least two ports;
    a message controller transferring the received message to a predetermined STP processor if the received message supports an Audio Video Bridging (AVB) protocol, and forwarding the received message to another activated port of another relay apparatus without passing the received message through the predetermined STP processor if the received message does not support the AVB protocol; and
    the predetermined STP processor creating a spanning tree from which a repeated route is removed, on the basis of the message received from the message controller.

2. The relay apparatus of claim 1, wherein the STP processor creates the spanning tree using the received message if the received message supports the AVB protocol, thereby minimizing the number of AVB clouds in the network.

3. The relay apparatus of claim 1, wherein the message processor determines whether the received message supports the AVB protocol, on the basis of a group MAC address included in the received message.

4. The relay apparatus of claim 3, wherein the message processor transfers the received message to the predetermined STP processor if the group MAC address included in the received message is a group MAC address of an extra area which is assigned for the AVB protocol.

5. The relay apparatus of claim 3, wherein the message processor forwards the received message to another activated port without passing the received message through the predetermined STP processor, if the group MAC address included in the received message is a group MAC address of a normal area.

6. The relay apparatus of claim 1, wherein the received message is a bridge packet data unit (BPDU) including information for setting up a network path.

7. A network system supporting a spanning protocol (STP) comprising:
    at least one Audio Video Bridging (AVB) bridge using a group MAC address of an extra area which is assigned to exchange a STP message between AVB clouds in the network system; and
    at least one non-AVB bridge using a group MAC address of a normal area which is assigned to exchange the STP message between non-AVB bridges in the network system,
    wherein if the AVB bridge receives the STP message including the group MAC address of the extra area, the STP message is transferred to a predetermined STP processor of the AVB bridge to create a spanning tree, and
    wherein, if the AVB bridge receives the STP message including the group MAC address of the normal area, the AVB bridge forwards the STP message to a non-AVB port outside a boundary of an AVB cloud without creating the spanning tree.

8. The network system of claim 7, wherein the AVB bridge creates the spanning tree using the STP message including the group MAC address of the extra area, thereby minimizing the number of AVB clouds in the network system.

9. The network system of claim 7, wherein, if the non-AVB bridge receives the STP message using the group MAC address of the extra area, the non-AVB bridge ignores or discards the STP message.

10. The network system of claim 7, wherein the STP message is a bridge packet data unit (BPDU) including information for setting up a network path.

11. The network system of claim 7, wherein the STP message between said AVB clouds is different from the STP message between said non-AVB bridges.

12. A method of creating a spanning tree in a network supporting a spanning tree protocol (STP), the method comprising:
    receiving, by a first relay node, a message for setting up a network path from one of at least two ports;
    determining, by the first relay node, whether the received message supports an Audio Video Bridging (AVB) protocol, on the basis of a group MAC address included in the received message; and
    forwarding, by the first relay node, the received message to another activated port in a second relay node without passing the received message through a predetermined STP processor of the first relay node if the received message does not support the AVB protocol, and transferring, by the first relay node, the received message to the predetermined STP processor of the first relay node to create a spanning tree from which a repeated route is removed using the received message if the received message supports the AVB protocol.

13. The method of claim 12, wherein the forwarding of the received message to another activated port and the creating of the spanning tree comprises minimizing a number of AVB clouds in the network system by creating the spanning tree using the received message if the received message supports the AVB protocol.

14. The method of claim 12, wherein the determining of whether the received message supports the AVB protocol comprises determining whether the received message supports the AVB protocol using a group MAC address included in the received message.

15. The method of claim 12, wherein the forwarding of the received message to another activated port or the creating of the spanning tree comprises creating the spanning tree using the received message if the group MAC address included in the received message is a group MAC address of an extra area which is assigned for the AVB protocol.

16. The method of claim 12, wherein the forwarding of the received message to another activated port and the creating of the spanning tree comprises forwarding the received message to another activated port, without creating the spanning tree using the received message, if the group MAC address included in the received message is a group MAC address of a normal area.

17. The method of claim 12, wherein the received message is a bridge packet data unit (BPDU) including information for setting up a network path.

* * * * *